Patented Oct. 28, 1924.

1,513,207

UNITED STATES PATENT OFFICE.

WALTER B. ALLEN, OF WORCESTER, MASSACHUSETTS, ASSIGNOR TO CRAFTEX COMPANY, OF BOSTON, MASSACHUSETTS, A CORPORATION OF MASSACHUSETTS.

INTERIOR WALL FINISH.

No Drawing.   Application filed October 18, 1922.   Serial No. 595,411.

*To all whom it may concern:*

Be it known that I, WALTER B. ALLEN, a citizen of the United States, residing at Worcester, in the county of Worcester and State of Massachusetts, have invented new and useful Improvements in Interior Wall Finishes, of which the following is a specification.

My invention consists of a paint to be applied to interior walls of buildings for the purpose of providing an economical coating and finish.

My composition consists essentially of a mixture of casein, a relatively small quantity of an alkaline substance, a substantial quantity of neutral mineral filler such as ground mica or clay, and a vegetable constituent approximating one half of the entire composition.

In my application for Letters Patent of the United States now pending, Serial Number 533,667, filed February 2nd, 1922, I have described a paint for wall coating or finish consisting of a composition of casein and certain mineral substances, but I have discovered since that application was filed that an equally satisfactory if not superior product can be made by using vegetable substance to a large extent as the base of the composition. I find that wood pulp, paper pulp, sawdust, ground straw, corn stalks, or sugar cane or other waste vegetable products of that character can be used successfully for the purpose resulting in great economy in the manufacture and use of the paint.

In preparing the composition I prefer to use the ingredients in about the following proportions, namely, forty-five pounds of some vegetable substance of the character mentioned, thirty-five pounds of china clay, fifteen pounds of casein and five pounds of lime. Good results may be obtained however when the ingredients are varied somewhat in proportions.

These ingredients are mixed with any desired coloring matter and a quantity of warm water sufficient to form a fluid of slightly greater consistency than ordinary house paint. It may be applied in one or more coats, but one coat of my composition is generally sufficient to accomplish the desired result.

My composition is equally adapted for a finish over wall paper or plastered surfaces in either new or repair work, and it can usually be applied without any preparation of the surface to which it is to be applied, and can be used in a single coat, thereby producing a finish equal or superior in quality to ordinary paint, more convenient to use and at less expense.

What I claim and desire to secure by Letters Patent is:

1. A composition for interior wall finish containing casein, and a filler composed of mineral substances and vegetable fibres, the quantity of filler being not less than three times the quantity of casein.

2. A composition for interior wall finish comprising casein, a proportionally small quantity of lime and a filler composed of neutral mineral substances and vegetable fibres in approximately the following proportions: thirty-five per cent of the entire composition being mineral, and forty-five per cent being vegetable.

3. A composition for interior wall finish comprising the following ingredients in approximately the proportions set forth, namely, fifteen pounds of casein, five pounds of lime, thirty-five pounds of neutral mineral substances, and forty-five pounds of vegetable fibres.

In testimony whereof I have hereunto set my hand in presence of two subscribing witnesses, this 16th day of October 1922.

WALTER B. ALLEN.

Witnesses:
 PAUL F. PERKINS,
 ALICE G. SULLIVAN,